(12) United States Patent
Wang et al.

(10) Patent No.: US 12,730,869 B2
(45) Date of Patent: Sep. 8, 2026

(54) BIOMETRIC EXTRACTION METHOD AND DEVICE FOR SECURE MULTI-PARTY COMPUTATION SYSTEM

(71) Applicant: CHINA UNIONPAY CO., LTD., Shanghai (CN)

(72) Inventors: Qi Wang, Shanghai (CN); Yongkai Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 10 days.

(21) Appl. No.: 18/705,116

(22) PCT Filed: Oct. 13, 2022

(86) PCT No.: PCT/CN2022/125042
§ 371 (c)(1),
(2) Date: Apr. 26, 2024

(87) PCT Pub. No.: WO2023/071812
PCT Pub. Date: May 4, 2023

(65) Prior Publication Data

US 2024/0427867 A1 Dec. 26, 2024

(30) Foreign Application Priority Data

Oct. 27, 2021 (CN) ........................ 202111258774.0

(51) Int. Cl.
*G06F 21/32* (2013.01)

(52) U.S. Cl.
CPC .................................... *G06F 21/32* (2013.01)

(58) Field of Classification Search
CPC ........ G06N 3/0464; G06N 3/08; G06N 3/045; G06F 21/32; G06V 40/168; G06V 10/82;
(Continued)

(56) References Cited

U.S. PATENT DOCUMENTS

2017/0076146 A1* 3/2017 Saripalle .............. G06V 10/993
2017/0243225 A1* 8/2017 Kohli ............... G06Q 20/40145
(Continued)

FOREIGN PATENT DOCUMENTS

CN 108446680 A 8/2018
CN 111612127 A 9/2020
(Continued)

OTHER PUBLICATIONS

Cai, Y., & Tang, C. (Jul. 2016). Securely outsourced face recognition under federated cloud environment. In 2016 15th International Symposium on Parallel and Distributed Computing (ISPDC) (pp. 269-276). IEEE. (Year: 2016).*
(Continued)

*Primary Examiner* — Rodman Alexander Mahmoudi
*Assistant Examiner* — Dorianne Alvarado David
(74) *Attorney, Agent, or Firm* — MARSHALL, GERSTEIN & BORUN LLP

(57) ABSTRACT

A biometric feature extraction method for a secure multi-party computation system. The method comprises: acquiring preprocessed fragments of a biometric feature; and performing feature extraction on the preprocessed fragments using a neural network, wherein in the first N convolutional and pooling layers, performing data computation on the preprocessed fragments by means of secure multi-party computation respectively to obtain intermediate data; and in the convolutional and pooling layers subsequent to the Nth layer, aggregating the intermediate data to a single-party server platform for subsequent computation, and inputting the same to a fully connected layer for completing feature extraction. There also relates to a biometric feature extraction device for a secure multi-party computation system, a computer storage medium and a computer program product.

20 Claims, 2 Drawing Sheets

(58) Field of Classification Search

CPC .............. G06V 10/771; H04L 2209/46; H04L 63/0861; H04L 9/3231; G06T 2207/20084

USPC ............................................................ 726/18

See application file for complete search history.

(56) References Cited

U.S. PATENT DOCUMENTS

| | | | | |
|---|---|---|---|---|
| 2019/0355126 | A1* | 11/2019 | Sun | G06T 3/16 |
| 2020/0184190 | A1* | 6/2020 | Chang Lee | G06V 40/1347 |
| 2020/0342297 | A1* | 10/2020 | Dai | G06N 3/0464 |
| 2021/0194874 | A1* | 6/2021 | Herder, III | G06N 3/04 |
| 2023/0106829 | A1* | 4/2023 | Streit | H04L 9/3231 713/186 |
| 2023/0128577 | A1* | 4/2023 | Schei | G06F 21/32 726/18 |
| 2024/0185571 | A1* | 6/2024 | Ye | G06V 10/22 |

FOREIGN PATENT DOCUMENTS

| | | | | | |
|---|---|---|---|---|---|
| CN | 112949545 | A | | 6/2021 | |
| CN | 113190858 | A | * | 7/2021 | G06F 18/241 |
| CN | 114511705 | A | | 5/2022 | |
| TW | I709107 | B | | 11/2020 | |
| TW | 202115622 | A | | 4/2021 | |
| WO | WO-2021063056 | A1 | * | 4/2021 | G06V 10/30 |

OTHER PUBLICATIONS

Haghighat, M., Zonouz, S., & Abdel-Mottaleb, M. (2015). CloudID: Trustworthy cloud-based and cross-enterprise biometric identification. Expert Systems with Applications, 42(21), 7905-7916. (Year: 2015).*

Hassan, A., Liu, F., Wang, F., & Wang, Y. (2021). Secure image classification with deep neural networks for IoT applications. Journal of Ambient Intelligence and Humanized Computing, 12(8), 8319-8337. (Year: 2021).*

Wang, X., Xue, H., Liu, X., & Pei, Q. (2019). A privacy-preserving edge computation-based face verification system for user authentication. IEEE Access, 7, 14186-14197. (Year: 2019).*

Huang, K., Liu, X., Fu, S., Guo, D., & Xu, M. (2019). A lightweight privacy-preserving CNN feature extraction framework for mobile sensing. IEEE Transactions on Dependable and Secure Computing, 18(3), 1441-1455. (Year: 2019).*

Taiwan patent application No. 111139387, Office Action and Search Report, dated Jul. 21, 2023.

Xu et al., Research on heterogeneous privacy computing platform interoperability system based on middleware and blockchain, Information and Communication Technology and Policy (2021).

Chinese Patent Application No. 202111258774.0, Office Action, dated Jul. 15, 2024.

International Search Report, corresponding to International Application No. PCT/CN2022/125042, mailing date Dec. 15, 2022.

* cited by examiner

BIOMETRIC EXTRACTION METHOD AND DEVICE FOR SECURE MULTI-PARTY COMPUTATION SYSTEM

CROSS-REFERENCE TO RELATED APPLICATIONS

The present application is a U.S. national stage of International Application No. PCT/CN2022/125042, filed Oct. 13, 2022 which claims priority to Chinese Patent Application CN202111258774.0, titled "BIOMETRIC FEATURE EXTRACTION METHOD AND DEVICE FOR SECURE MULTI-PARTY COMPUTATION SYSTEM", filed on Oct. 27, 2021, the disclosures of which are incorporated herein by reference in their entirety for all purposes.

FIELD

The present application relates to the field of biometric feature extraction, and in particular to a biometric feature extraction method and device for a secure multi-party computation system, and a non-transitory computer storage medium.

BACKGROUND

In recent years, biometric features (for example, faces, fingerprints etc.) have gradually become the mainstream identification method due to their close correlation with individual identities, and there are many applications in important financial scenarios such as withdrawal, payment, and mobile banking login. Currently, the vast majority of biometric feature extraction systems directly collect and store plaintext original images of biometric features (for example, original images of faces, fingerprints) While this scheme can achieve good biometric feature matching, at the same time, there are huge security risks and privacy compliance issues, for biometric data cannot be altered or destroyed in the event of leakage. Moreover, biometric features are related to user privacy, so there is a compliance risk in collecting and storing plaintext original images directly.

Secure multi-party computation, also known as MPC or SMPC, is a good technical solution. Biometric feature extraction based on MPC technology can realize secure sharing of biometric information, and reduce the risks of personal information and property information caused by biometric information leakage. However, in the scenario of biometric feature extraction based on secure multi-party computation, both the computational complexity and the communication overhead for multi-party MPC platform interaction are considerable, which does not meet practical application requirements of production scenarios.

SUMMARY

According to an aspect of the present disclosure, there is provided a biometric feature extraction method for a secure multi-party computation system. The method comprises: acquiring preprocessed fragments of a biometric feature; and performing feature extraction on the preprocessed fragments using a neural network, wherein in the first N convolutional and pooling layers of the neural network, a multi-party server platform in the secure multi-party computation system performs data computation on the preprocessed fragments by means of secure multi-party computation respectively to obtain intermediate data, the intermediate data being processing results of the first N convolutional and pooling layers, the processing results being unable to be reversibly recovered to the preprocessed fragments, and N being a natural number; in the convolutional and pooling layers subsequent to the Nth layer of the neural network, aggregating the intermediate data to a single-party server platform in the secure multi-party computation system for subsequent computation, and inputting the intermediate data to a fully connected layer for completing feature extraction.

According to another aspect of the present disclosure, there is provided a biometric feature extraction device for a secure multi-party computation system. The device comprises: a processing system; and a memory storing instructions that, when executed by the processing system, cause the system to: acquire preprocessed fragments of a biometric feature; and perform feature extraction on the preprocessed fragments using a neural network, wherein in the firstN convolutional and pooling layers of the neural network, a multi-party server platform in the secure multi-party computation system performs data computation on the preprocessed fragments by means of secure multi-party computation respectively to obtain intermediate data, the intermediate data being processing results of the first N convolutional and pooling layers, the processing results being unable to be reversibly recovered to the preprocessed fragments, and N being a natural number. In the convolutional and pooling layers subsequent to the Nth layer of the neural network, the intermediate data are aggregated to a single-party server platform in the secure multi-party computation system for subsequent computation, and input to a fully connected layer for completing feature extraction.

According to yet another aspect of the present disclosure, there is provided a non-transitory computer storage medium comprising instructions which, when executed, perform the method as described above.

The biometric feature extraction scheme according to one or more embodiments of the present disclosure involves during feature extraction, in the first N convolutional and pooling layers, a multi-party server platform in the secure multi-party computation system performing data computation on the preprocessed fragments by means of secure multi-party computation respectively to obtain intermediate data, where N is a natural number; and in the convolutional and pooling layers subsequent to the Nth layer of the neural network, aggregating the intermediate data to a single-party server platform in the secure multi-party computation system for subsequent computation. This reduces backend computational complexity and communication overhead, and improves performance.

BRIEF DESCRIPTION OF THE DRAWINGS

The above and other objectives and advantages of the present disclosure will be rendered more complete and clear from the following detailed description in conjunction with the accompanying drawings, wherein the same or similar elements are denoted with the same reference numerals.

DETAILED DESCRIPTION OF EMBODIMENTS

A biometric feature extraction scheme for a secure multi-party computation system according to various exemplary embodiments of the present disclosure will be described hereinafter in detail with reference to the drawings.

Figure 1:
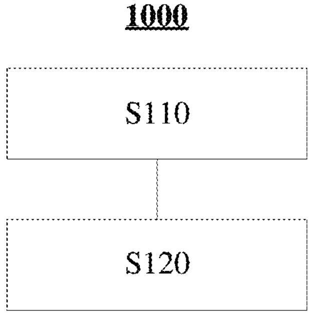
FIG. 1 shows a schematic flow diagram of a biometric feature extraction method for a secure multi-party computation system according to one embodiment of the present disclosure.

FIG. 1 shows a schematic flow diagram of a biometric feature extraction method 1000 for a secure multi-party computation system according to one embodiment of the present disclosure. As illustrated in FIG. 1, the biometric feature extraction method 1000 for a secure multi-party computation system comprises the following steps:

In step S110, acquiring preprocessed fragments of a biometric feature; and

In step S120, performing feature extraction on the preprocessed fragments using a neural network, wherein in the first N convolutional and pooling layers of the neural network, a multi-party server platform in the secure multi-party computation system performs data computation on the preprocessed fragments by means of secure multi-party computation respectively to obtain intermediate data, the intermediate data being processing results of the first N convolutional and pooling layers, the processing results being unable to be reversibly recovered to the preprocessed fragments, and N being a natural number; in the convolutional and pooling layers subsequent to the Nth layer of the neural network, the intermediate data are aggregated to a single-party server platform in the secure multi-party computation system for subsequent computation, and input to a fully connected layer for completing feature extraction.

In the context of the present disclosure, the so-called "secure multi-party computation" aims to solve collaborative computing problems for a group of mutually distrusting participants, with privacy protected. It is to ensure input independence, computing correctness, decentralization and other features, while not leaking input values to other members participating in the computation. Each participating node in the secure multi-party computation has equal status, and can either initiate a collaborative computing task or choose to participate in a computing task initiated by others. Routing, addressing and computational logic transmission are controlled by hub-nodes, which concurrently perform the search for relevant data and the transmission of computational logic. Each secure multi-party computation node completes data extraction and computation in a local database in accordance with computational logic, and routes the output computational result to a designated node, so that multi-party nodes complete the collaborative computing task and output a sole result. Throughout the process, the data of all parties are in the local area, and with data privacy guaranteed, the computational results are fed back to the entire computing task system, so that each party gets a correct data feedback.

In the secure multi-party computation based on secret sharing, data inputs and computed intermediate values are present in the form of "segments". For example, privacy data may be segmented into two or more shares, and then the random segments are distributed to computing participants. This process not only protects data privacy but also allows multiple parties to jointly compute the data. Thereafter, by leveraging the homomorphic computing properties between the segments, it is feasible to conduct computations on these segments and reconstruct computational results of privacy data.

In the context of the present disclosure, the term "client", also known as a user terminal, refers to a device or apparatus that provides local services to users. In one or more embodiments, the client has some basic functions, including an acquisition function of acquiring biometric feature information of a user, and a data processing function of extracting a feature value from the acquired biometric feature information using a pre-stored extraction algorithm in the client, etc. The client may be a user's smart device, including but not limited to a user's mobile phone, a laptop computer, and a head-mounted device.

The term "server platform", also known as a backend/cloud server, refers to a device or apparatus corresponding to the "client" and providing remote services to the client. In one or more embodiments, the server platform may be a MPC face platform.

In the context of the present disclosure, the term "biometric feature" or "biometric feature information" refers to any information inherent in the human body that may be used for personal identification, including but not limited to physiological features (such as fingerprints, irises, physiognomy, DNA etc.) and behavioral features (such as gait, keystroke habits, etc.). In addition, in the context of the present disclosure, "preprocessed fragments of a biometric feature" are obtained by preprocessing "fragments" of biometric feature information.

The term "feature extraction" refers to the extraction or computation of a feature vector of a particular dimension from biometric feature information using a particular algorithm (such as an extraction algorithm), so that the distance between two feature vectors of different biometric feature information (such as different faces) is as large as possible.

In the context of the present disclosure, "intermediate data" refer to processing results of the first N convolutional and pooling layers of the neural network. The processing results cannot be reversibly recovered to inputs of the neutral network (i.e. the preprocessed fragments), which can effectively ensure data security. N may be a natural number. For example, when N=1, "intermediate data" represent the output obtained by processing through the first convolutional and pooling layer of the neural network. N may be selected as needed, but regardless of the selection, it is crucial to ensure that the processing results of the first N convolutional and pooling layers (i.e. "intermediate data") cannot be reversibly recovered to the preprocessed fragments.

In one embodiment, the neural network comprises multiple convolutional layers, pooling layers and fully connected layers. In the computational process of the first N convolutional and pooling layers, N is a natural number, a multi-party server platform in the secure multi-party computation system performs data computation on the preprocessed fragments by means of secure multi-party computation respectively; in the computational process of the subsequent convolutional and pooling layers, the intermediate data of the neural network are aggregated to a single-party server platform in the secure multi-party computation system for subsequent computation. The intermediate data are processing results of the first N convolutional and pooling layers, which cannot be reversibly recovered.

In the neural network, a convolutional layer consists of a group of convolutional units (also known as "convolutional kernels"). Generally, the convolutional kernels are regarded as filters, through which a specific feature is extracted, thereby obtaining a plurality of feature maps (deep-level feature maps are typically obtained through multi-layer convolution). The pooling layer reduces the dimension by selecting a value to represent all pixel values in a range, and reduces the image size (performs feature compression) while retaining the features, thereby reducing the computational complexity of the network. The fully connected layer generally converts two-dimensional feature maps output by convolution into one-dimensional vectors to identify features of an image.

For example, in an embodiment where the secure multi-party computation system is a multi-party MPC face platform (Note: the term "multi-party" denotes "two or more parties"), the multi-party MPC face platform, based on the input preprocessed fragments of a facial image, completes data processing and computation of the fragments, in the computational process such as convolution and pooling of the first layer of a deep neural network (Note: considering that reverse recovery of a facial image may be not limited to the first layer, this may also occur, for example, in the first two/three layers). In the subsequent computational processes such as convolution and pooling, the intermediate data of the neural network are aggregated to one party for completing the face feature extraction process. As such, in this embodiment, during feature extraction, secure multi-party computation on image fragments is only performed in the first layer. In the subsequent processing, the original image is processed (by one party alone) based on the multi-party MPC platform nodes. This avoids communication overhead and consolidated computational overhead incurred by the multi-party MPC platform performing secure multi-party computation based on image fragments, and significantly reduces the processing complexity and increases processing efficiency of the MPC platform.

In a further embodiment, inputting to a fully connected layer for completing feature extraction comprises: enabling the server platform of each party to obtain fragments of a biometric feature value by means of secure multi-party computation respectively in the fully connected layer.

In one embodiment, the fragments of a biometric feature value are realized by constructing computational operators corresponding to the server platform of each party in the average pooling layer and the fully connected layer, wherein the fragments of a biometric feature value comprise a first feature vector and a second feature vector, wherein the first feature vector is stored in a first-party server platform of the multi-party server platform, and the second feature vector is stored in a second-party server platform of the multi-party server platform. For example, in an embodiment where the secure multi-party computation system is a multi-party MPC face platform, fragmentation of a face feature vector is implemented in the fully connected layer based on the multi-party MPC face platform, and multiple parties (for example, two or more parties) store a user's face feature value fragment information. This ensures that the biometric feature extraction system based on secure multi-party computation technology not only can protect biometric privacy information, but also can perform distributed computation on image features based on multiple parties.

Although not shown in FIG. 1, in one embodiment, the above method 1000 may further comprise: at the time of client registration, receiving original image fragments of a first biometric feature and feature value fragments from the client, and storing them.

In one embodiment, the step S110 comprises: receiving original image fragments of a second biometric feature from the client; and preprocessing the original image fragments of the second biometric feature to obtain the preprocessed fragments. In other words, in this embodiment, the client only needs to provide original image fragments of a biometric feature, and does not need to preprocess the original image fragments, thereby reducing the processing requirements of the client. In another embodiment, when the client possesses relevant processing capabilities, it is also possible to directly receive preprocessed original image fragments of a biometric feature from the client.

In one embodiment, the above method 1000 may further comprise: performing similarity comparison computation on biometric features, based on the feature value fragments or the original image fragments of the first biometric feature uploaded by the client, and the fragments of the biometric feature value in the secure multi-party computation system, according to operational rules and equation decomposition of secure multi-party computation. For example, during the facial comparison stage, facial similarity comparison computation is performed based on the feature value fragments/facial image fragments uploaded by the client, and the feature value fragments stored in the backend multi-party MPC face feature comparison platform, according to MPC operational rules and equation decomposition.

In one embodiment, the above method 1000 may further comprise: at the time of the update of a comparison algorithm of the secure multi-party computation system, performing computation of a new feature value based on the stored original image fragments of the first biometric feature. In one embodiment, performing computation of a new feature value based on the stored original image fragments of the first biometric feature comprises: after preprocessing the original image fragments of the first biometric feature, re-performing feature extraction using the neural network.

For example, at the time of client registration, both original image fragments of the biometric feature and feature value fragments are stored in the backend by means of uploading the original image fragments of the biometric feature and the feature value fragments. In the facial comparison stage, facial similarity comparison computation is performed based on the feature value fragments/facial image fragments uploaded by the client, and the feature value fragments stored in the backend multi-party MPC face feature comparison platform, according to MPC operational rules and equation decomposition. At the time of the update of a backend comparison algorithm, the algorithm upgrade logic is decoupled from the terminal-side business by performing computation of a user's new feature value and version upgrade based on the original image fragments of the biometric feature stored in the secure multi-party computation platform.

In one embodiment, the original image fragments of the first or second biometric feature are facial images, and preprocessing the original image fragments of the second biometric feature comprises: preprocessing the facial images, in the manner of secret sharing by constructing MPC multiplication, MPC addition to realize the operation of operators/functions.

Secret sharing is a technology for sharing a secret among a group of participants. It is mainly used to protect important information, and to prevent the information from being lost, destroyed or tampered with. It is originated from the classical cryptographic theory first proposed by Sharmir and Blakley in 1979. To put it simply, secret sharing refers to reasonably distributing a shared secret among a user group, to achieve the purpose of all members jointly holding the secret. In a method based on Shamir's secret sharing theory, the secret sharing mechanism is mainly composed of elements such as a secret distributer D, group participants P {P1, P2, . . . , Pn}, an access structure, a secret space, a distribution algorithm, and a recovery algorithm.

(I) Technical Process of Secret Sharing

Objective: Assuming that there is a secret S, a specific operation is performed on the secret S to get w secret fragments Si (0<i<=w) for w individuals to store. When at least t individuals simultaneously bring out their respective secret fragments Si, the original secret S can be recovered.

Secret generation: A polynomial is constructed: $F(x)=S+a_1*x^1+a_2*x^2+ \ldots +a_{(t-1)}*x^{(t-1)} \bmod(p)$, wherein S is the secret to be protected, p is a prime number, and S<p. Take w different x values, and substitute them into F(x) to get w groups of (xi, yi) which are distributed to w individuals. Then, p is disclosed, and the polynomial is destroyed. Each individual is responsible for keeping the respective (xi, yi) confidential.

Secret recovery: When x=0, F(0)=S, i.e. S can be recovered; t groups of (xi, yi) are substituted into the following equation:

$$F(x) = \sum_{i=1}^{t}\left(yi \prod_{1\le j\le t, j\ne i}(x-x_j)\left(\prod_{1\le j\le t, j\ne i}(x_j-x_i)\right)^{-1}\right)\bmod(p),$$

wherein the negative first power is the inverse of the modulo p. By substituting t groups of (xi, yi) into the equation, S can be recovered.

In a computational example, assuming that there are w=4 individuals, at least t=3 individuals are set to recover the secret, the secret S=2, p=23, a polynomial is constructed: $F(x)=2+3x+2x^2 \bmod(23)$. Take x1=1, x2=2, x3=3, x4=4, and substitute them into the equation to get y1=7, y2=16, y3=6, y4=0. Three groups (1,7) (3,6) (4,0) are utilized for recovery. Upon computation, S=2.

$$S = F(0) = 7*(0-3)*(0-4)*((1-3)*(1-4))^{-1} + 6*(0-1)*(0-4)*((3-1)*(3-4))^{-1} + 0*(0-1)*(0-3)*((4-1)*(4-3))^{-1}\bmod(23)$$

Likewise, another three groups (2,16) (3,6) (4,0) are utilized for recovery. Upon computation, S=2.

(II) Illustrative Example of MPC Addition based on Secret Sharing

Given: A holds 100, B holds 70, C holds 2. Objective: Compute their sum, and ensure that any two of ABC together can get the sum.

Since: Any two parties of ABC can solve, then ABC each construct a 2-variable 1-degree polynomial, such as A(n) =100+2n, B(n)=70+3n, C(n)=2+8n. Let ABC be numbered as 1, 2, 3, then A gets A(1), B(1), C(1) which are 102, 73, 10 respectively; B gets A(2), B(2), C(2) which are 104, 76, 18 respectively; C gets A(3), B(3), C(3) which are 106, 79, 26 respectively. Finally, A (1,102+73+10=185), B (2,104+76+18=198), C (3,106+79+26=211). Decryption process (i.e., the process of calculating their sum): Since any two parties can solve, a first-degree polynomial $y=a_0+a_1*x$ is constructed. Then, two parties, i.e. A (1,185) and C (3,211), are substituted into the equation to get $a_0=172$.

It can be seen from the above that throughout the computational process, the result of A+B+C can be finally obtained, without leaking the secret of ABC.

(III) Illustrative Example of MPC Multiplication Based on Secret Sharing

Figure 3:
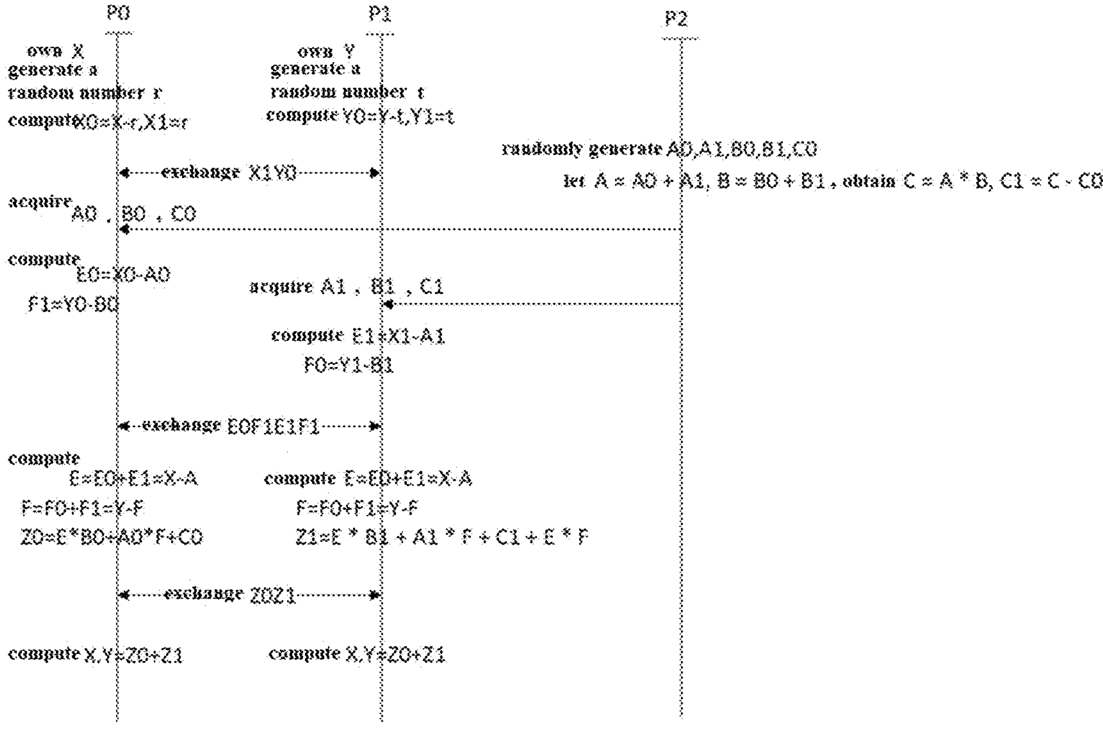
FIG. 3 shows an example of a computational process of MPC multiplication based on secret sharing.

MPC multiplication based on secret sharing: This means I have one data and you have one data, and the product of the data can be computed on the premise of not leaking each other's data. FIG. 3 shows an example of the computational process of MPC multiplication based on secret sharing.

As illustrated in FIG. 3, since the auxiliary computation node (P2) generates the numbers A0A1B0B1C0C1 related to three types of random numbers A, B, C, it is named a triplet. The derivation process is as follows:

$$1)\ X*Y=(A+X-A)*(B+Y-B);$$

2) Let E=X−A, F=Y−B, rearrange the equation to: X*Y=(A+E)*(B+F)=AB+BE+AF+EF;

3) Let C=AB, rearrange the equation to: X*Y=C+BE+AF+EF; Next: Let B=B0+B1, A=A0+A1, C=C0+C1, rearrange the equation to: X*Y=C0+C1+E(B0+B1)+F(A0+A1)+EF;

4) Split into two shares, namely: Z0=E*B0+F*A0+C0, Z1=X*Y−Z0=C0+C1+E(B0+B1)+F(A0+A1)+EF−C0−EB0−FA0=C1+EB1+FA1+EF. Obviously, P0 is to compute Z0, and P1 is to compute Z1. B0, A0, C0 and C1, B1, A1 need to be prepared respectively, and these two groups of data may be distributed by P2;

5) E and F are E=X−A, F=Y−B respectively, and they are each split into two shares E0=X0−A0, E1=X1−A1, F0=Y0−B0, F1=Y1−B1. Obviously, P0 holds E0, F0, and P1 holds E1, F1. It is only necessary to use P0 to generate a random number r, and let X1=X−r.

In other words, to realize X*Y, it is only necessary to prepare random numbers (A0B0C0A1B1C1) in advance. The data Z0, Z1 respectively computed by P0 and P1 are only a part of X*Y, and they are added together to obtain X*Y.

A person skilled in the art may easily understand that, the biometric feature extraction method 1000 for a secure multi-party computation system according to the above one or more embodiments of the present disclosure can be implemented by a computer program. For example, the computer program is included in a computer program product, and the computer program, when executed by a processor, implements the biometric feature extraction method 1000 for a secure multi-party computation system according to one or more embodiments of the present disclosure. For another example, when a non-transitory computer storage medium (such as a USB flash drive) with the computer program stored therein is connected to a computer, the biometric feature extraction method for a secure multi-party computation system according to one or more embodiments of the present disclosure can be implemented by running the computer program.

Figure 2:
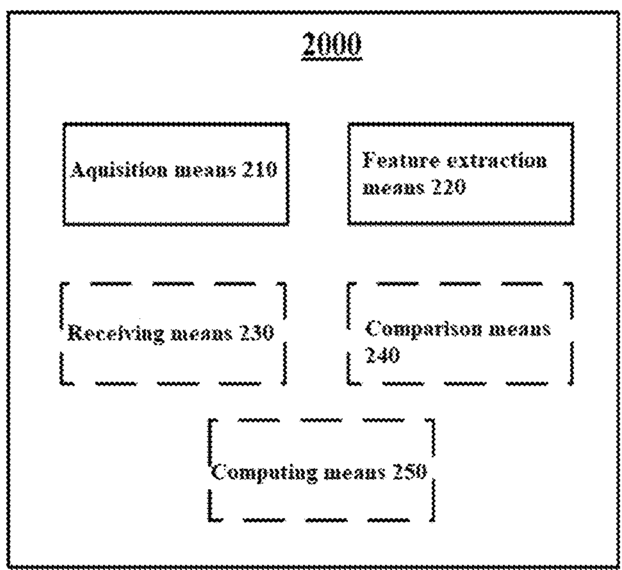
FIG. 2 shows a schematic structural diagram of a biometric feature extraction device for a secure multi-party computation system according to one embodiment of the present disclosure.

Referring to FIG. 2, FIG. 2 shows a schematic structural diagram of a biometric feature extraction device 2000 for a secure multi-party computation system according to one embodiment of the present disclosure. As illustrated in FIG. 2, the biometric feature extraction device 2000 for a secure multi-party computation system comprises: an acquisition means 210 and a feature extraction means 220. The acquisition means 210 is used to obtain preprocessed fragments of a biometric feature; and the feature extraction means 220 is used to perform feature extraction on the preprocessed fragments using a neural network, wherein the feature extraction means 220 is configured to, in the first N convolutional and pooling layers of the neural network, perform data computation on the preprocessed fragments by means of secure multi-party computation respectively to obtain intermediate data by a multi-party server platform of the secure multi-party computation system, the intermediate data being processing results of the first N convolutional and pooling layers, the processing results being unable to be reversibly recovered to the preprocessed fragments, and N being a natural number; the feature extraction means 220 is further configured to, in the convolutional and pooling layers subsequent to the Nth layer of the neural network, aggregate the intermediate data to a single-party server platform in the secure multi-party computation system for subsequent computation, and input the intermediate data to a fully connected layer for completing feature extraction.

In the context of the present disclosure, the so-called "secure multi-party computation" aims to solve collaborative computing problems for a group of mutually distrusting participants, with privacy protected. It is to ensure input independence, computing correctness, decentralization and other features, while not leaking input values to other members participating in the computation. Each participating node in the secure multi-party computation has equal status, and can either initiate a collaborative computing task or choose to participate in a computing task initiated by others. Routing, addressing and computational logic transmission are controlled by hub-nodes, which concurrently perform the search for relevant data and the transmission of computational logic. Each secure multi-party computation node completes data extraction and computation in a local database in accordance with computational logic, and routes the output computational result to a designated node, so that multi-party nodes complete the collaborative computing task and output a sole result. Throughout the process, the data of all parties are in the local area, and with data privacy guaranteed, the computational results are fed back to the entire computing task system, so that each party gets a correct data feedback.

In the secure multi-party computation based on secret sharing, data inputs and computed intermediate values are present in the form of "segments". For example, privacy data may be segmented into two or more shares, and then the random segments are distributed to computing participants. This process not only protects data privacy but also allows multiple parties to jointly compute the data. Thereafter, by leveraging the homomorphic computing properties between the segments, it is feasible to conduct computations on these segments and reconstruct computational results of privacy data.

In the context of the present disclosure, the term "client", also known as a user terminal, refers to a device or apparatus that provides local services to users. In one or more embodiments, the client has some basic functions, including an acquisition function of acquiring biometric feature information of a user, and a data processing function of extracting a feature value from the acquired biometric feature information using a pre-stored extraction algorithm in the client, etc. The client may be a user's smart device, including but not limited to a user's mobile phone, a laptop computer, and a head-mounted device.

The term "server platform", also known as a backend/cloud server, refers to a device or apparatus corresponding to the "client" and providing remote services to the client. In one or more embodiments, the server platform may be a MPC face platform.

In the context of the present disclosure, the term "biometric feature" or "biometric feature information" refers to any information inherent in the human body that may be used for personal identification, including but not limited to physiological features (such as fingerprints, irises, physiognomy, DNA etc.) and behavioral features (such as gait, keystroke habits, etc.). The term "feature extraction" refers to the extraction or computation of a feature vector of a particular dimension from biometric feature information using a particular algorithm (such as an extraction algorithm), so that the distance between two feature vectors of different biometric feature information (such as different faces) is as large as possible.

In one embodiment, the neural network comprises multiple convolutional layers, pooling layers and fully connected layers. In the neural network, a convolutional layer consists of a group of convolutional units (also known as "convolutional kernels"). Generally, the convolutional kernels are regarded as filters, through which a specific feature is extracted, thereby obtaining a plurality of feature maps (deep-level feature maps are typically obtained through multi-layer convolution). The pooling layer reduces the dimension by selecting a value to represent all pixel values in a range, and reduces the image size (performs feature compression) while retaining the features, thereby reducing the computational complexity of the network. The fully connected layer generally converts two-dimensional feature maps output by convolution into one-dimensional vectors to identify features of an image.

In one embodiment, the feature extraction means 220 is configured to, in the computational process of the first N convolutional layers and pooling layers, where N is a natural number, perform data computation on the corresponding preprocessed fragments by means of secure multi-party computation respectively by a multi-party server platform in the secure multi-party computation system, and in the computational process of the subsequent convolutional and pooling layers, configured to aggregate intermediate data to a single-party server platform in the secure multi-party computation system for computation. For example, in an embodiment where the secure multi-party computation system is a multi-party MPC face platform, the multi-party MPC face platform, based on the input preprocessed fragments of a facial image, completes data processing and computation of the fragments, in the computational process such as convolution and pooling in the first layer of a deep neural network (Note: considering that reverse recovery of a facial image may be not limited to the first layer, this may also occur, for example, in the first two/three layers). In the subsequent computational processes such as convolution and pooling, the intermediate data of the neural network are aggregated to one party for completing the face feature extraction process. As such, in this embodiment, during feature extraction, secure multi-party computation on image fragments is only performed in the first layer. In the subsequent processing, the original image is processed based on the multi-party MPC platform nodes. This avoids communication overhead and consolidated computational overhead incurred by the multi-party MPC platform performing secure multi-party computation based on image fragments, and significantly reduces the processing complexity and increases processing efficiency of the MPC platform.

In a further embodiment, the feature extraction means 220 is configured to enable the server platform of each party to obtain fragments of a biometric feature value respectively by means of secure multi-party computation in the fully connected layer. In one embodiment, the feature extraction means 220 is configured to realize the fragments of a biometric feature value by constructing computational operators corresponding to the server platform of each party in the average pooling layer and the fully connected layer, wherein the fragments of a biometric feature value comprise a first feature vector and a second feature vector, wherein the first feature vector is stored in a first-party server platform of the multi-party server platform, and the second feature vector is stored in a second-party server platform of the multi-party server platform. For example, fragmentation of a face feature vector is implemented in the fully connected layer based on the multi-party (two or more parties) MPC face platform, and multiple parties store a user's face feature value fragment information. This ensures that the biometric feature extraction system based on secure multi-party computation technology not only can protect biometric privacy information, but also can perform distributed computation on image features based on multiple parties.

In one embodiment, the above device 2000 may further comprise: a receiving means 230 for receiving original image fragments of a first biometric feature and feature value fragments from the client, and storing them, at the time of client registration.

In one embodiment, the acquisition means 210 comprises: a receiving unit for receiving original image fragments of a second biometric feature from the client; and a preprocessing unit for preprocessing the original image fragments of the second biometric feature to obtain the preprocessed fragments. In other words, in this embodiment, the client only needs to provide original image fragments of a biometric feature, and does not need to preprocess the original image fragments, thereby reducing the processing requirements of the client. In another embodiment, when the client possesses relevant processing capabilities, the acquisition means 210 may also directly receive preprocessed original image fragments of a biometric feature from the client.

In one embodiment, the above device 2000 may further comprise: a comparison means 240 for performing similarity comparison computation on biometric features, based on the feature value fragments or the original image fragments of the first biometric feature uploaded by the client, and the fragments of the biometric feature value in the secure multi-party computation system, according to operational rules and equation decomposition of secure multi-party computation. For example, during the facial comparison stage, the comparison means 240 is configured to perform facial similarity comparison computation based on the feature value fragments/facial image fragments uploaded by the client, and the feature value fragments stored in the backend multi-party MPC face feature comparison platform, according to MPC operational rules and equation decomposition.

In one embodiment, the above device 2000 may further comprise: a computing means 250 for performing computation of a new feature value based on the stored original image fragments of the first biometric feature, at the time of the update of a comparison algorithm of the secure multi-party computation system. In one embodiment, the computing means 250 may be configured to re-perform feature extraction using the neural network, after preprocessing the original image fragments of the first biometric feature. For example, at the time of client registration, both original image fragments of the biometric feature and feature value fragments are stored in the backend by means of uploading the original image fragments of the biometric feature and the feature value fragments. During the facial comparison stage, the comparison means performs facial similarity comparison computation based on the feature value fragments/facial image fragments uploaded by the client, and the feature value fragments stored in the backend multi-party MPC face feature comparison platform, according to MPC operational rules and equation decomposition. At the time of the update of a backend comparison algorithm, the feature extraction device is configured to perform computation of a user's new feature value and version upgrade based on the original image fragments of the biometric feature stored in the secure multi-party computation platform, so that the algorithm upgrade logic is decoupled from the terminal-side business.

In one embodiment, the original image fragments of the first/second biometric feature are facial images. In this embodiment, the preprocessing unit may be configured to preprocess the facial images, in the manner of secret sharing by constructing MPC multiplication, MPC addition to realize the operation of operators/functions.

The biometric feature extraction scheme for a secure multi-party computation system according to one or more embodiments of the present disclosure will be described in detail hereinafter, by taking facial recognition as an example.

In the implementations of facial recognition technology, the essential image processing procedure is as follows: facial image acquisition→face detection→image preprocessing→face feature extraction→face feature comparison→facial recognition result. Among them, "face detection" refers to accurately demarcating the location and size of the face from the input image, and outputting the coordinates of the circumscribed rectangle of the face in the image, which may also include posture such as tilt angle and other information. "Image preprocessing" refers to preprocessing the image by performing grayscale correction, noise filtering and the like based on face detection results, for example, light compensation, grayscale transformation, histogram equalization, normalization, geometric correction, filtering and sharpening of the facial image. "Face feature extraction" generally refers to processing the face subjected to preprocessing and face detection through a neural network, to obtain feature vectors of a particular dimension (for characterizing the face), so that the distance between two feature vectors of different faces is as large as possible, and the distance between two feature vectors of the same face is as small as possible. "Face feature comparison" refers to comparing the face feature data to be identified with the face feature template registered and stored in the database, and by setting a threshold value, outputting the comparison result when the similarity exceeds this threshold value. There are two types of facial recognition, i.e. 1:1 and 1:N.

An implementation of facial recognition is provided as follows:

1) Facial image acquisition: acquiring facial images through camera lens.

2) Face detection: accurately demarcating the location and size of the face from the images, and selecting some rectangular features that best represent the face. Typically, a Haar classifier in OpenCV is an improved version based on the Viola-Jones method (real-time target detection based on Haar-like features and realized by an Adaboost classifier), and others such as MTCNN, Faster-CNN and SSD may be used.

The following is an example of the computational process of detecting the face location using Histogram of Oriented Gradients (HOG):

HOG (Histogram of Oriented Gradients) constitutes features by computing and counting the histograms of oriented gradients within local regions (Cells and Blocks) of an image. First, an entire image is partitioned into Cells (small regions) of equal size, for example, an image is first partitioned into small regions of 20 pixel*20 pixel; then, the histograms of oriented gradients of these small regions are computed respectively; next, a certain number of small regions constitute Blocks (larger regions), for example, 2*2 Cells constitute 1 Block; later, the feature vectors of the histograms of oriented gradients of the Blocks constitute the features of the histograms of oriented gradients (HOG) of the entire image.

For an image I (x,y), to compute the gradients of the image in the horizontal and vertical orientations, a first-order differential operator Sobel in OpenCV may be used for computation to obtain the gradient images in the X and Y orientations. Then, the gradient orientation and the gradient magnitude of each pixel in each small region are computed according to the following equation (1) and equation (2).

$$M(x, y) = \sqrt{I_x^2 + I_y^2} \quad (1)$$

$$\theta(x, y) = \tan^{-1}\frac{I_y}{I_x} \in [0, 360^\circ)\text{or} \in [0, 180^\circ) \quad (2)$$

The angle of the gradient orientation computed by equations is a radian value ranging from 0 to 360 degrees. To simplify computation, the range of the gradient orientation is restrained to a range from 0 to 180 degrees and divided into 9 orientations, with each orientation spanning 20 degrees. Then, the constrained angle is divided by 20 to obtain the angle value of the gradient orientation in a range of [0, 9).

The gradient magnitude in each Cell is counted according to 9 orientations. Upon completion of computation, a histogram of oriented gradients with the horizontal ordinate X as the gradient orientation and the vertical ordinate Y as the gradient magnitude will be generated. The orientation histogram corresponding to the Cell is converted into a single-dimensional vector, and the number of gradients in the corresponding orientation is encoded according to a specified class interval, to obtain 9 histogram HOG features for a single Cell.

3) Image Preprocessing

Image preprocessing comprises image grayscaling and color space conversion, normalization, denoising enhancement, face alignment, etc., wherein the image grayscaling and color space conversion mainly comprises: a) converting color images into black and white images for the convenience of later processing, Gray=0.229R+0.587G+0.11B (R is a red component, G is a green component, B is a blue component); b) to ensure real-time display of face(s) on LCD, switching the digital video data from the YCrCb 4:2:2 format output by video decoding to the RGB color space data format for display on LCD or CRT.

The equations of converting YCrCb 4:2:2 video data to RGB color space are as follows:

$$R = 1.164(Y - 16) + 1.596(Cr - 128),$$
$$G = 1.164(Y - 16) - 0.813(Cr - 128) - 0.392(Cb - 128),$$
$$B = 1.164(Y - 16) + 2.017(Cb - 128).$$

The objective of normalization is to obtain standardized facial images with uniform size and the same range of grayscale values. Exemplary steps of geometric normalization are as follows: (1) acquiring feature points, for example, using the [x,y]=ginput (3) function to demarcate three feature points, namely, two eyes and a nose, and obtaining coordinate values of these three feature points; (2) rotating the images based on the coordinate values of the left and right eyes to ensure consistency in face orientation, and assuming the distance between the two eyes as d, with the midpoint being 0; (3) determining a rectangular feature region based on the face feature points and geometric models, and clipping the rectangular region by taking O as the reference point, cutting d from the left and right sides respectively, and cutting 0.5 d and 1.5 d in the vertical orientation respectively; (4) performing scale transformation on facial expression sub-region images to have uniform sizes to facilitate the extraction of facial expression features. The clipped images are standardized to 90*100 images to realize geometric normalization of the images.

Denoising enhancement refers to denoising and enhancing images through a filter which may comprise a linear filter and a non-linear filter. Median filtering is a typical non-linear smooth filtering method. Gaussian smooth filtering is the most commonly utilized linear smooth filtering. Gaussian smooth filtering is implemented as follows: first determining a neighborhood which is a window range with a pixel in the middle of the window, so that each pixel has a fixed window range; scanning each pixel, to obtain a weighted average grayscale value from all pixels within the window range determined by each pixel; and using the weighted average grayscale value to replace the original value of the pixel at the center of the window.

For a face alignment algorithm, "a facial image" along with "a facial coordinate box" are used as an input, resulting in an output of a coordinate sequence for facial key points. The number of facial key points is a preset fixed value that may be defined based on different semantics (commonly 5 points, 68 points, 90 points, etc.). For example, Dlib has specialized functions and models capable of locating 68 face feature points.

4) Face Feature Extraction

A numerical string capable of characterizing a certain face feature is referred to as "Face feature". A neural network is trained to generate 128-dimensional predicted values from an input facial image. The training process is generally as follows: feeding two different photos of the same person and a photo of another person into the neural network, and performing iterative training to make the predicted values for the coded two photos of the same person converge, and the predicted values for the photos of different persons diverge. In other words, the intra-class distance is reduced, while the inter-class distance is increased.

5) Face Feature Comparison

By inputting a face feature, and comparing it one by one with the features corresponding to N identities registered in the database, the "one" feature that is most similar to the input feature is found out. The value of the highest similarity is then compared with a preset threshold value. If it is greater than the threshold value, the identity corresponding to that feature is returned, otherwise, "not in the database" is returned. There are various comparative methods, including directly identifying the face with the smallest Euclidean distance within the range of the threshold value, or training a terminal SVM or knn classifier.

Figure 4:
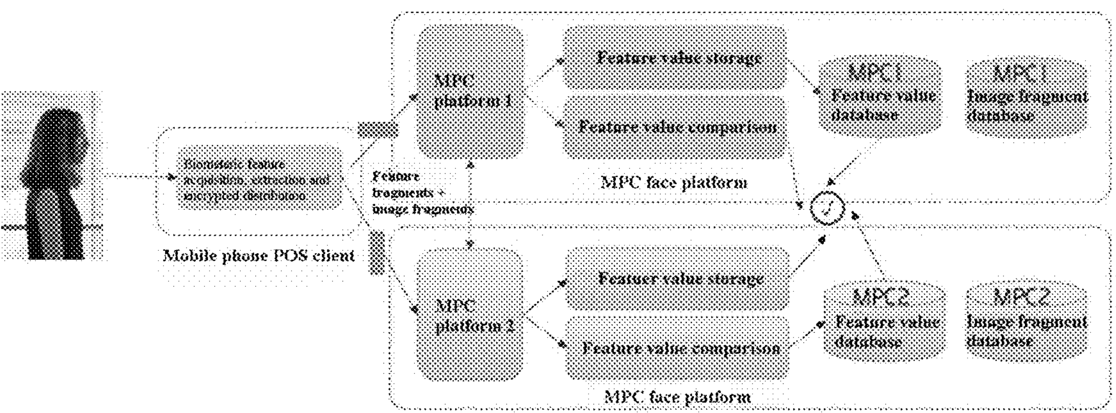
FIG. 4 shows an architecture diagram of an MPC technology-based biometric feature identification platform according to one embodiment of the present disclosure.

FIG. 4 shows an architecture diagram of an MPC technology-based biometric feature identification platform according to one embodiment of the present disclosure. As illustrated in FIG. 4, a user needs to register when using the biometric feature identification function for the first time. During the registration, the user's original image is acquired by a mobile phone POS client. While the feature value is extracted and fragmented (for example, the client performs computation on the user's face feature value, and performs fragmentation on the output feature vector (for example, addition, subtraction or truncation of the random vector), and transmits two feature segments to MPC platforms of different organizations respectively), the original image of the face (or the preprocessed original image) is randomly segmented (ensuring that any one party cannot obtain the complete facial original image). Then, the fragments of the feature values and the fragments of the facial original images are transmitted to the cloud for the storage of feature values and facial image data.

Optionally, during the registration, the feature value of the user is computed only based on the image fragments and the MPC platform. In other words, the mobile phone POS client per se does not need to perform computation on the face feature value, which can advantageously reduce computational requirements of the client. For example, the client does not need to compute multiple versions of the feature value fragments, thereby improving user experience. The specific computational process is illustrated hereinafter by taking a two-party MPC computational process as an example:

(1) Image input: inputting facial original image segment 1 and facial original image segment 2 according to user information;

(2) Image grayscaling: a secure multi-party computation system performing image grayscaling by constructing MPC addition and MPC multiplication, in accordance with the computational equation for converting a RGB image to a grayscale image, so that two parties obtain the grayscale image fragment 1 and the grayscale image fragment 2, respectively;

(3) Face detection in images: computing gradient information and counting local information based on the extraction and computation steps of Hog face detection, and normalizing the gradient images of the Block composed of multiple adjacent Cells to finally obtain image detection windows, with each party of the two-party MPC platform respectively storing partial information;

(4) Normalization: completing the computation of the aforementioned procedures based on the two-party MPC platform, and performing translation and rotation transformation on the images, so that the transformed image is closest in distance to the reference facial image.

Translation may be accomplished by computing the average value, and then performing normalized computation on the points. Overall scaling may be accomplished by computing the variance of the points, and then performing normalized computation on the variance. Rotation may be accomplished by using an orthogonal matrix R, ensuring that the points after transformation by the R matrix are closest in distance to the reference figure. Finally, normalized facial image fragments that satisfy deep learning requirements are obtained.

(5) Convolutional and pooling computational process: performing convolution on the normalized facial image fragment data obtained by the two-party MPC platform. Taking GoogleNet network as an example, starting from the upper left corner of the image input, the number of rows and columns for sliding each time is referred to as the stride; meanwhile, at the boundary position, the size of the matrix is increased by padding, allowing the convolutional kernels to extend beyond the original image boundary, and ensuring the size of the result of the convolution to be the same as that of the original one. The image processing computational process of the GoogleNet network (including addition, multiplication, and functional operations in the convolutional and pooling layers) is accomplished through computational equations such as addition and multiplication constructed by the two-party MPC platform. In the subsequent convolutional and pooling computation, the intermediate computational results are aggregated to one party of the two-party MPC platform to complete the convolutional and pooling computational process.

For example, in the convolutional layer 1 (conv1), the input image size is (224, 224, 3), and ReLU serves as the activation function (other models may also use sigmoid activation function, etc.). After passing through the first layer of 64 7*7 convolutional kernels with a stride of 2 and boundary padding, the input image undergoes convolution ((224-7+3*2)/2+1=112.5 (rounded down)=112), resulting in an output feature map of 112*112*64. The output 112*112*64 obtained by the ReLU activation function passes through a second layer of 3*3 convolutional kernels with a stride of 2 (((112-3)/2)+1=55.5(rounded up)=56), resulting in an output feature map of 56*56*64. Then, Local Response Normalization (LRN) is carried out in the channel direction to obtain an output feature map (56*56*64) of convolutional layer 1 (conv1).

In the convolutional layer 2 (conv2), the input feature map is transformed into 56*56*64 using 64 1*1 convolutional kernels (dimension reduction before 3*3 convolutional kernels), followed by a ReLU operation. Then, a convolutional operation is performed using 3*3 convolutional kernels with a stride of 1 and padding of 1 and output channels of 192, resulting in an output feature map size of (56-3+1*2)/1+1=56 with the dimension of 56*56*192, followed by a ReLU operation. The pooling layer has a window size of 3*3, a stride of 1, and output channels of 192, resulting in an output feature map with the dimension of 56*56*192.

In the convolutional layer 3 (conv3), at first, 3*3 convolutional kernels with a stride of 2 are used for operation to output a feature map of 28*28*192. Then, 64 1*1 convolutional kernels are used for operation to output a feature map of 28*28*64, followed by a ReLU operation (Result 1). Next, 96 1*1 convolutional kernels are used for operation to output a feature map of 28*28*96, followed by a ReLU operation. Then, 128 3*3 convolutional kernels are used for operation to output a feature map of 28*28*128 (Result 2). Subsequently, 16 1*1 convolutional kernels transform the feature map into 28*28*16, followed by ReLU computation, and 32 5*5 convolutional kernels are used for operation to output 28*28*32 (Result 3). In the pooling layer, 3*3 kernels are used to output 28*28*192, and 32 1*1 convolutions are carried out to output 28*28*32 (Result 4). The four results are then connected/concatenated (DepthConcat) to concatenate the third dimension of these four parts of the output result, i.e., 64+128+32+32=256, ultimately producing an output of 28*28*256.

The subsequent GoogleNet fourth layer (4a, 4b, 4c, 4d, 4e), fifth layer (5a, 5b) . . . have similar computational processes to 3a, 3b, and therefore will not be repeated here.

(6) Fully connected layer: In the neural network structure, following feature extraction in the feature extraction layer, a fully connected layer is introduced. Each neuron in this layer is interconnected with all neurons in the previous layer, flattening the convolutional output into a one-dimensional vector. In GoogleNet, the network ultimately uses Average Pooling to replace the fully connected layer. Meanwhile, adding a fully connected layer allows for flexible adjustment to the output feature value. In the computation of the fully connected layer, the feature vectors after fully connected are obtained by the two-party MPC platform separately by constructing computational operators of the two-party MPC platform in the average pooling layer and the fully connected layer.

(7) Output layer: Following the computation of the fully connected layer, two MPC parties obtain the feature value segments of the finally output feature vector respectively (feature vector 1, feature vector 2), with the feature vector 1 stored by the MPC platform 1, and the feature vector 2 stored by the MPC platform 2.

In one embodiment, when a user performs payment authentication, the mobile phone POS client will acquire original images of a biometric feature and extract the feature value, and then transmit them to the cloud after random fragmentation. The MPC platform in the cloud will perform a 1:1 or 1:N comparison on the user feature and the feature database using the feature value comparison algorithm, and determine based on the comparison results whether the compared feature value and the registered feature value fall within the allowable threshold range. In an optional embodiment, during the comparison, the mobile phone POS client may still perform image fragmentation and transmission of the image fragments to the cloud for the computation of the feature vectors and the comparison of the feature vectors (which is done internally in the MPC platform).

In one embodiment, when an algorithm needs to be updated, no operation is required on the client side. Since the user has uploaded fragment data of the facial original image during the registration process, when the algorithm is upgrading, the facial image may be preprocessed based on the image fragments stored in the cloud, thereby ensuring that the preprocessed data is consistent with the data of the facial original image for feature extraction. Then, feature extraction is performed based on the MPC platform according to the standard face feature extraction method, and the final results are randomly fragmented into a feature vector 1 and a feature vector 2, which are stored in face feature database of different organizations respectively. In this way, backend batch feature updates can be realized without substantially changing the mobile phone POS client business process and interaction flow, which is not perceptible to the user. Meanwhile, as the feature update is decoupled from the comparison logic, this will not affect the normal operation of the previous business logic, and there is low complexity for reconfiguration.

In summary, the biometric feature extraction scheme according to one or more embodiments of the present disclosure is directed to a secure multi-party computation platform. During the algorithm upgrade, the original image fragments of two/multiple biometric features only need to go through such processes as detection and preprocessing; during the feature extraction, secure multi-party computation on the image fragments is only performed in the first layer or the first N layers; and in the subsequent processing, the original image is processed based on the multi-party MPC platform nodes, thereby avoiding communication overhead and consolidated computational overhead incurred by two/multiple MPC platforms performing secure multi-party computation based on image fragments, and significantly reducing the processing complexity and increasing processing efficiency of the MPC platforms. This enables the biometric feature identification system based on secure multi-party computation technology not only can protect biometric privacy information, but also can reduce network communication overhead and computational logic complexity of the MPC platforms, and achieve commercially available and easy-to-use algorithm upgrade based on the distributed computation of image features by two/multiple parties.

While the above specification merely describes some embodiments of the present disclosure, it is to be understood by a person skilled in the art that the present disclosure can be implemented in many other forms without departing from its spirit and scope. For example, on the client side, every time when there is a new comparison request, it is possible to either submit feature value fragments or original image (such as facial image) fragments of a biometric feature, or submit both of them, so as to be compatible with requirements of different application scenarios and security requirements. Correspondingly, on the server side, it is also possible to provide corresponding processing logics to different request methods.

Therefore, the examples and embodiments demonstrated herein are deemed as illustrative rather than restrictive, and the present disclosure may cover various modifications and replacements without departing from the spirit and scope of the present disclosure as defined by the appended claims.

The invention claimed is:

1. A biometric feature extraction method for a secure multi-party computation system, comprising:

acquiring preprocessed fragments of a biometric feature; and performing feature extraction on the preprocessed fragments using a neural network, wherein in first N convolutional and pooling layers of the neural network, a multi-party server platform in the secure multi-party computation system performs data computation on the preprocessed fragments by means of secure multi-party computation respectively to obtain intermediate data, the intermediate data being processing results of the first N convolutional and pooling layers, the processing results being unable to be reversibly recovered to the preprocessed fragments, and N being a natural number;

in convolutional and pooling layers subsequent to the Nth layer of the neural network, the intermediate data are aggregated to a single-party server platform in the secure multi-party computation system for subsequent computation, and input to a fully connected layer for completing feature extraction.

2. The method according to claim 1, wherein inputting to the fully connected layer for completing the feature extraction comprises: enabling the server platform of each party to obtain fragments of a biometric feature value by means of secure multi-party computation respectively in the fully connected layer.

3. The method according to claim 2, wherein the fragments of the biometric feature value are realized by constructing computational operators corresponding to the server platform of each party in an average pooling layer and the fully connected layer, wherein the fragments of the biometric feature value comprise a first feature vector and a second feature vector, wherein the first feature vector is stored in a first-party server platform of the multi-party server platform, and the second feature vector is stored in a second-party server platform of the multi-party server platform.

4. The method according to claim 1, further comprising:

at the time of client registration, receiving original image fragments of a first biometric feature and feature value fragments from the client, and storing them.

5. The method according to claim 1, wherein acquiring the preprocessed fragments of the biometric feature comprises:

receiving original image fragments of a second biometric feature from a client; and preprocessing the original image fragments of the second biometric feature to obtain the preprocessed fragments.

6. The method according to claim 4, further comprising:

performing similarity comparison computation on biometric features, based on the feature value fragments or the original image fragments of the first biometric feature uploaded by the client, and fragments of a biometric feature value in the secure multi-party computation system, according to operational rules and equation decomposition of secure multi-party computation.

7. The method according to claim 4, further comprising:

at the time of an update of a comparison algorithm of the secure multi-party computation system, performing computation of a new feature value based on the stored original image fragments of the first biometric feature.

8. The method according to claim 7, wherein performing computation of the new feature value based on the stored original image fragments of the first biometric feature comprises:

after preprocessing the original image fragments of the first biometric feature, re-performing feature extraction using the neural network.

9. The method according to claim 1, wherein the secure multi-party computation system is a multi-party MPC face platform.

10. The method according to claim 5, wherein the original image fragments of the second biometric feature are facial images, and preprocessing the original image fragments of the second biometric feature comprises:

preprocessing the facial images, in a manner of secret sharing by constructing MPC multiplication, MPC addition to realize an operation of operators/functions.

11. A biometric feature extraction device for a secure multi-party computation system, comprising:

a processing system; and a memory storing instructions that, when executed by the processing system, cause the system to:

acquire preprocessed fragments of a biometric feature; and perform feature extraction on the preprocessed fragments using a neural network, wherein in first N convolutional and pooling layers of the neural network, a multi-party server platform in the secure multi-party computation system performs data computation on the preprocessed fragments by means of secure multi-party computation respectively to obtain intermediate data, the intermediate data being processing results of the first N convolutional and pooling layers, the processing results being unable to be reversibly recovered to the preprocessed fragments, and N being a natural number;

in convolutional and pooling layers subsequent to the Nth layer of the neural network, the intermediate data are aggregated to a single-party server platform in the secure multi-party computation system for subsequent computation, and input to a fully connected layer for completing feature extraction.

12. The device according to claim 11, wherein execution of the instructions further causes the system to enable the server platform of each party to obtain fragments of a biometric feature value respectively by means of secure multi-party computation in the fully connected layer.

13. The device according to claim 12, wherein execution of the instructions further causes the system to implement the fragments of the biometric feature value in an average pooling layer and the fully connected layer by constructing computational operators corresponding to the server platform of each party, wherein the fragments of the biometric feature value comprise a first feature vector and a second feature vector, wherein the first feature vector is stored in a first-party server platform of the multi-party server platform, and the second feature vector is stored in a second-party server platform of the multi-party server platform.

14. The device according to claim 11, wherein execution of the instructions further causes the system to:

receive original image fragments of a first biometric feature and feature value fragments from the client, and storing them, at the time of client registration.

15. The device according to claim 11, wherein execution of the instructions further causes the system to:

receive original image fragments of a second biometric feature from a client; and preprocess the original image fragments of the second biometric feature to obtain the preprocessed fragments.

16. The device according to claim 14, wherein execution of the instructions further causes the system to:

perform similarity comparison computation on biometric features, based on the feature value fragments or the original image fragments of the first biometric feature uploaded by the client, and fragments of a biometric feature value in the secure multi-party computation system, according to operational rules and equation decomposition of secure multi-party computation.

17. The device according to claim 14, wherein execution of the instructions further causes the system to:

perform computation of a new feature value based on the stored original image fragments of the first biometric feature, at the time of an update of a comparison algorithm of the secure multi-party computation system.

18. The device according to claim 17, wherein execution of the instructions further causes the system to re-perform feature extraction using the neural network, after preprocessing the original image fragments of the first biometric feature.

19. The device according to claim 15, wherein the original image fragments of the second biometric feature are facial images, and execution of the instructions further causes the system to preprocess the facial images, in a manner of secret sharing by constructing MPC multiplication, MPC addition to realize an operation of operators/functions.

20. A non-transitory computer storage medium, comprising instructions which, when executed, perform the method according to claim 1.

* * * * *